Patented Feb. 17, 1925.

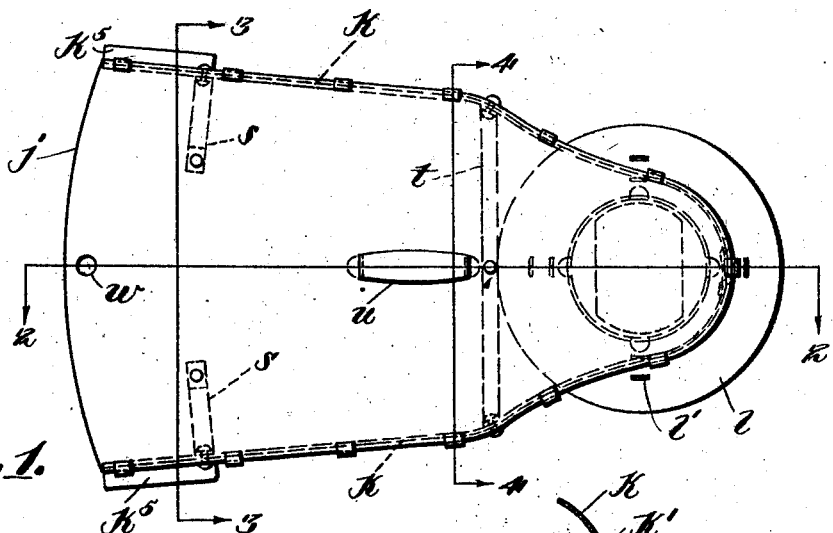

1,526,340

UNITED STATES PATENT OFFICE.

HENRICK J. HJORTH, OF WOBURN, MASSACHUSETTS.

PORTABLE SMOKE HOOD FOR STOVES.

Application filed March 14, 1923. Serial No. 624,918.

*To all whom it may concern:*

Be it known that I, HENRICK J. HJORTH, a citizen of the United States, residing at Woburn, in the county of Middlesex and State of Massachusetts, have invented new and useful Improvements in Portable Smoke Hoods for Stoves, of which the following is a specification.

This invention is concerned with the culinary arts and particularly with the cooking of food in open vessels on a stove. Steam, smoke, and odors (any or all of which may be generically characterized as vapors, for the purposes of this specification) are frequently given off from the food being thus cooked and from the water or fat used in cooking, and are disseminated throughout the kitchen and frequently into other rooms as well. The emission of smoke is particularly copious and obnoxious when foods are fried with fat in a skillet, but steam and odors arise also from pots and pans in which meats, vegetables, etc., are boiled in water. The placing of a loose cover over the skillet or pan does not avoid the trouble, but for all intents and purposes a pot or pan with a cover over it is an open cooking vessel, so far as concerns the emission of smoke, steam and odors.

In some large kitchens a hood with an exhaust pipe is placed over the cooking stove to carry away the vapors arising from cooking utensils, but the expense and bulk of such affixed hoods prevent their being used to any considerable extent in dwelling houses and apartments. Also they are not perfectly effective, because the height at which they must be placed above the stove, in order to give room for the activities of the cook, makes it possible for much of the vaporous matter to escape the influence of the hood, and remain in the room.

The object of my invention is to furnish a hood of such small dimensions that it may be applied to any stove directly over the cooking utensil where it will carry away all of the vapors, and one which can be removed from the stove and put away when not in use and then will not occupy much storage space; and also one which can be made and sold at such a low price as will place it within the reach of the great majority of housekeepers.

The invention consists in a hood capable of fulfilling the foregoing objects and having characteristics which I will now describe in connection with one specific embodiment which, at the present time, I consider preferable to other possible forms of the invention.

In the drawings:—

Figure 1 is a plan view of a hood or vapor conductor embodying this invention.

Figure 2 is a longitudinal section of the hood taken on line 2—2 of Figure 1, showing also the manner in which the hood is applied to a stove to accomplish its intended purpose.

Figures 3 and 4 are cross sections of the hood taken on lines 3—3 and 4—4, respectively of Figure 1.

Figure 5 is a perspective view showing a detail of the fastening means which I prefer to use for connecting the parts of the hood together.

Figure 6 is another detail view showing in horizontal section the mode of connecting the side members of the hood at one end of the latter.

The hood or vapor conductor in which this invention resides is intended and adapted to be placed on the top of a cooking stove with one part over the cooking vessel from which vapors arise and the other end over one of the holes of the stove, from which there is free course to the stovepipe or chimney.

Referring to Figure 2, which shows this relation, $a$ represents the hood as a whole and $b$ represents conventionally a typical cooking stove. $c$ is the top plate of the stove, $d$ the fire space in which fuel is burned, $e$ the stack or stovepipe, and $f$ the space under the stove top which is open from the fire box to the stack. $g$ and $h$ represent two of the holes with which the top plates of cooking stoves are ordinarily provided and over any of which a cooking utensil may be placed. The drawing shows a skillet $i$ over the hole $g$.

My vapor conductor is adapted to rest on the stove top and is of such proportions that when one end overlies any one of the holes, its body part and other end may embrace a cooking vessel on one of the other holes.

Coming now to a description in detail of the hood, the same consists of a top $j$ and sides $k$, $k$. These are the essential parts or members of the hood and may be made in two or more pieces or cast, pressed, or molded all in one piece. At the present time I prefer to make them out of sheet metal in three pieces, the top being of an outline substantially as shown in Figure 1, and each of the two side pieces being of a length to extend from the corners of the wider end of the top, to a point slightly beyond the middle of the narrow end, and of an outline to conform with the edges of the top between these points.

Various modes of uniting the side pieces to the top piece and to one another may be availed of. I prefer, however, to accomplish this purpose by forming the pieces with registering lugs and slots, passing the lugs of one piece through the slots of the other and bending them over. Where the adjacent ends of the two side pieces meet and overlap they are interlocked by the tongue and slot connection shown in detail in Figure 6, each side piece having a tongue or lug $k^1$ on its end and a slot $k^2$ at a distance back from its end. The tongue $k^1$ of each piece is passed through the slot $k^2$ of the other piece and then bent flat against the adjacent surface of the other piece.

On the upper edges of the side pieces are formed at intervals tongues or lugs $k^3$ and these lugs are passed through correspondingly located slots $j'$ in the top piece near its edge, and then bent down against the top piece. Preferably these slots are nearer the edge of the top piece than the length of the lugs $k^3$, and the latter are bent outwardly and curled around such edge in order to increase the security of the interlock and to lessen the chance of the lugs catching on other articles.

The principal parts of the hood thus formed and assembled produce a structure which is open at one end and at the under side, but is closed on the under side by the stove top when placed over a cooking utensil. Preferably the side pieces $k$ are tapered or wedge-shaped, which has the result of causing the open end to be raised higher than the closed end above the stove top. The lower edges of these side pieces may be provided with foot lips or flanges $k^5$ of any desired length and bent outward or inward, but preferably outward to increase the area of bearing surface of the hood on the stove top. Evidently the cooking vessel can easily be placed in and removed from the hood, and there is ample room for a draft of air to draw away the vapors rising from the vessel. The hood, if made of a width or radius at its closed end large enough to include one of the stove holes, may serve its intended purpose without further adjuncts, but, in order to reduce its area and so cause it to take up less space on the stove top, I prefer to make its closed end narrower than the diameter of the stove hole and to provide it with a plate $l$ large enough to overlap the rim of the hole.

This plate is provided with two or more sets or series of slots, through one set of which pass lugs $k^4$ of the side walls and such lugs are turned over to secure the plate to such side walls.

A cylindrical rib $m$ is mounted on the under side of this plate and is secured by lugs $m'$ passing through slots of one of the other series. Within the outline of the rib $m$ or plate $l$ is formed an opening of any desired extent up to the full area bounded by the rib $m$. I have here shown the opening as slightly less than such full area.

The rib $m$ is of a diameter to pass through the central hole of the stove hole cover $p$, said cover being one of a sort commonly used, having a central opening and a secondary cover on the latter. But I may make the rib $m$ nearly as large as the full diameter of the stove hole and attach it by passing its lugs through the outer series of slots $l'$ in the plate $l$.

Angle braces $s$, $s$ are attached to the top and sides of the hood near its open end, and a cross brace $t$ is connected at its ends with the opposite side pieces and at its middle point with the top piece. These braces help to stiffen the structure of the hood, but they are unessential so far as the principles of the invention are concerned. A handle $u$ is preferably made from a strip of sheet metal, with its ends bent down and through slots in the top plate and then outward against the under side of the plate. A hole $w$ is formed in the top plate near the open end of the hood, for convenience in hanging it up in a closet when not in use.

When the hood is placed on a stove so as to enclose a cooking vessel and with the opening in its closed end over one of the stove holes, the draft up the chimney causes air to be drawn into the open end of the hood and across the cooking vessel, carrying with it all vapors which are given off from the cooking food. Thus the annoyance due to the odors and smoke from cooking food filling the kitchen and passing into adjoining rooms is avoided, for the vapors are carried away through the chimney even more completely than is done when an overhead hood is placed above the stove. A cooking vessel wherever placed on the stove may be served by the hood provided there is any unoccupied hole in the stove top, and when not needed for its intended purpose the hood may be hung up in a closet or laid away on a shelf without taking up much room. It is also inexpensive to make and may be purchased by users at moderate cost.

The use of this hood is not exclusively limited to stoves for burning coal or wood, that is, solid fuel, but may be extended to forms of gas or oil stove and the like which have a top plate with holes over the burners and a stack leading from another hole in the top plate and adapted to carry away gases from beneath such plate. Neither is its use limited to cooking vessels, for it can also be placed so as to secure the desired result with meat, etc., being broiled over an open fire.

While in the broad sense and within the scope of my broad claim to protection, the plate $l$ and rib $m$ are not essential and may be omitted, provided the enclosed end of the hood is wide enough to embrace the circuit of the hole in the stove top, nevertheless these members are useful and important adjuncts and are claimed as such. The circular rib $m$, which is adapted to enter a stove hole and may be made large enough to fit freely within an entirely uncovered hole in the stove top, or small enough to enter a central opening in the hole cover, is a means for quickly and accurately centering the outlet of the hood with respect to the stove hole, and also serves to prevent accidental displacement of the hood such as would bring it out of register with the hole and so impair the draft through it. Then the plate $l$, which is preferably made large enough to extend beyond the rib $m$ more than the difference between the diameter of this rib and the full diameter of the stove hole, will overlie the hole and prevent the draft being broken, even if the rib is not central in the hole. When the rib is in the central position, the overlap of the plate on the stove top beyond the rim of the hole diminishes leakage of air and so improves the useful draft through the hood.

What I claim and desire to secure by Letters Patent is:

1. A portable smoke hood for cooking stoves comprising side walls embracing a space and arranged to enclose such space at one end while leaving it open at the opposite end, a top extending over the space embraced by said walls, and a plate underlying said side walls at the closed end of the interior space, projecting beyond the side walls, and having an opening into such space.

2. A portable smoke hood for cooking stoves comprising side walls embracing a space and arranged to enclose such space at one end while leaving it open at the opposite end, a top extending over the space embraced by said walls, a plate underlying said side walls at the closed end of the interior space and having an opening into such space, and a cylindrical rib extending downward from said plate and surrounding said opening.

3. A portable smoke hood for cooking stoves having side walls and a top wall arranged with a relatively small closed end and a relatively large open end, the hood having means adjacent to its closed end adapted to enter a stove hole and center such closed end with respect to the hole, said centering means having an interior passage for flow of smoke.

4. A portable smoke hood for cooking stoves comprising a top and lateral walls joined together and arranged to bound a space which is open at one end of the hood and closed at the opposite end of the hood, said hood including also a plate connected to and underlying the side walls at the closed end of the hood, which plate extends outwardly beyond said walls, said plate having an opening within the enclosure of said walls, and an annular rib projecting from the under side of the plate, surrounding such opening, and adapted to enter one of the holes in the top of the cooking stove so as to center that portion of the hood with respect to such a hole.

In testimony whereof I have affixed my signature.

HENRICK J. HJORTH.